United States Patent
Carlotto et al.

(10) Patent No.: US 10,721,382 B2
(45) Date of Patent: **\*Jul. 21, 2020**

(54) REFRIGERATORS HAVING INTERNAL CONTENT CAMERAS, AND METHODS OF OPERATING THE SAME

(71) Applicant: WHIRLPOOL CORPORATION, Benton Harbor, MI (US)

(72) Inventors: Victor Henrique Sfoggia Carlotto, Joinville (BR); Michael Todd Moore, Paw Paw, MI (US); Sushanth Purandhar, Pune (IN); Ryan Michael Post, Coloma, MI (US); Michael S. Richards, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,220

(22) Filed: Jul. 13, 2018

(65) Prior Publication Data

US 2018/0324340 A1 Nov. 8, 2018

Related U.S. Application Data

(63) Continuation of application No. 14/934,316, filed on Nov. 6, 2015, now Pat. No. 10,027,866.
(Continued)

(51) Int. Cl.
*H04N 5/00* (2011.01)
*H04N 5/225* (2006.01)
(Continued)

(52) U.S. Cl.
CPC .......... *H04N 5/2256* (2013.01); *F25D 29/00* (2013.01); *G06F 16/51* (2019.01); *H04N 5/2252* (2013.01); *H04N 5/247* (2013.01); *H04N 7/18* (2013.01)

(58) Field of Classification Search
CPC .......... F25D 29/00; F25D 25/00; F25D 25/02; F25D 2325/022; F25D 2700/08; G06Q 10/00; G06Q 10/087; F25B 2600/07
See application file for complete search history.

(56) References Cited

U.S. PATENT DOCUMENTS

| | | |
|---|---|---|
| 5,711,160 A | 1/1998 | Namisniak et al. |
| 5,930,766 A | 7/1999 | Gibb |

(Continued)

FOREIGN PATENT DOCUMENTS

| | | |
|---|---|---|
| EP | 284337 A1 | 3/2015 |
| GB | 2507929 A | 5/2014 |
| JP | 2015111026 A | 6/2015 |

*Primary Examiner* — Frank F Huang
(74) *Attorney, Agent, or Firm* — Price Heneveld LLP

(57) ABSTRACT

Example refrigerators having internal content cameras, and methods of operating the same are disclosed. A disclosed example refrigerator includes a cabinet, an internal compartment disposed within the cabinet, a closing member operatively coupled to the cabinet providing selective access to the internal compartment, two cameras disposed in the compartment and positioned to capture images of different portions of the compartment, two light sources disposed in the compartment, and a controller communicatively coupled with the cameras and light sources and configured to control the light sources to provide two different illuminations for respective ones of the two cameras.

12 Claims, 7 Drawing Sheets

Related U.S. Application Data

(60) Provisional application No. 62/201,328, filed on Aug. 5, 2015.

(51) Int. Cl.

| | | |
|---|---|---|
| *G06F 16/51* | (2019.01) | |
| *F25D 29/00* | (2006.01) | |
| *H04N 5/247* | (2006.01) | |
| *H04N 7/18* | (2006.01) | |

(56) References Cited

U.S. PATENT DOCUMENTS

| | | |
|---|---|---|
| 6,204,763 B1 | 3/2001 | Sone |
| 6,370,890 B2 | 4/2002 | Roh et al. |
| 6,393,848 B2 | 5/2002 | Roh et al. |
| 6,430,946 B2 | 8/2002 | Roh et al. |
| 6,442,952 B2 | 9/2002 | Roh et al. |
| 6,453,687 B2 | 9/2002 | Sharood et al. |
| 6,459,919 B1 * | 10/2002 | Lys ................ A61N 5/0616 315/291 |
| 6,644,046 B2 | 11/2003 | Roh et al. |
| 6,919,795 B2 * | 7/2005 | Roseen ............. F25D 25/00 340/309.16 |
| 7,050,991 B2 | 5/2006 | Ogasawara |
| 7,196,625 B1 | 3/2007 | Nguyen |
| 7,836,709 B2 | 11/2010 | An et al. |
| 7,908,019 B2 | 3/2011 | Ebrom et al. |
| 7,912,559 B2 | 3/2011 | McCoy et al. |
| 7,917,914 B2 | 3/2011 | McCoy et al. |
| 7,921,429 B2 | 4/2011 | McCoy et al. |
| 8,028,302 B2 | 9/2011 | Glotzbach et al. |
| 8,189,855 B2 | 5/2012 | Opalach et al. |
| 8,250,489 B2 | 8/2012 | Lee et al. |
| 8,328,438 B2 | 12/2012 | Johnson et al. |
| 8,345,686 B2 | 1/2013 | McCoy et al. |
| 8,441,534 B2 * | 5/2013 | Hubmer ........... G08B 13/2402 348/143 |
| 8,533,253 B2 | 9/2013 | McCoy et al. |
| 8,545,113 B2 | 10/2013 | Johnson et al. |
| 8,621,049 B2 | 12/2013 | Ebrom et al. |
| 8,629,753 B2 | 1/2014 | Yum et al. |
| 8,690,273 B2 * | 4/2014 | Dolinsek ........... F25D 23/028 312/223.6 |
| 8,746,296 B2 | 6/2014 | Tobbe et al. |
| 8,756,942 B2 | 6/2014 | Min et al. |
| 8,868,218 B2 | 10/2014 | Park et al. |
| 8,903,971 B2 | 12/2014 | DeVilbiss et al. |
| 8,912,905 B2 * | 12/2014 | Wong ............... F21V 23/0464 340/572.4 |
| 8,935,938 B2 * | 1/2015 | Krause ............... C02F 1/001 62/129 |
| 8,988,247 B1 | 3/2015 | Lee et al. |
| 9,009,811 B2 | 4/2015 | Ebrom et al. |
| 9,014,826 B2 | 4/2015 | Yum et al. |
| 9,024,716 B2 | 5/2015 | Yum et al. |
| 9,035,764 B2 | 5/2015 | Karaoguz et al. |
| 9,043,033 B2 | 5/2015 | Kim et al. |
| 9,074,806 B2 | 7/2015 | Cheon et al. |
| 9,152,135 B2 | 10/2015 | Broniak et al. |
| 9,173,188 B2 * | 10/2015 | Miyawaki ............ H04W 64/00 |
| 9,357,873 B2 * | 6/2016 | Reyhanloo .......... A47J 31/4485 |
| 9,412,086 B2 * | 8/2016 | Morse .................... F25D 29/00 |
| 9,545,930 B2 * | 1/2017 | Ricci .................. G01C 21/3484 |
| 2002/0066279 A1 | 6/2002 | Kiyomatsu |
| 2003/0167782 A1 | 9/2003 | Roh et al. |
| 2008/0278324 A1 * | 11/2008 | Uchimura ................ G01S 5/16 340/572.1 |
| 2010/0170289 A1 | 7/2010 | Graziano |
| 2010/0225484 A1 * | 9/2010 | Van De Sluis .......... G01S 1/70 340/572.4 |
| 2012/0241043 A1 * | 9/2012 | Perazzo ................ A61J 7/0053 141/2 |
| 2012/0265348 A1 | 10/2012 | Kim et al. |
| 2013/0010208 A1 | 1/2013 | Chiang |
| 2013/0080895 A1 * | 3/2013 | Rossman ............ G06F 3/04883 715/720 |
| 2013/0191243 A1 | 7/2013 | Jung et al. |
| 2014/0101589 A1 | 4/2014 | Hyun et al. |
| 2014/0137587 A1 | 5/2014 | Hitzelberger |
| 2014/0169640 A1 | 6/2014 | Park et al. |
| 2014/0195383 A1 | 7/2014 | Kim et al. |
| 2014/0232866 A1 * | 8/2014 | Lee ........................... G01S 5/16 348/143 |
| 2014/0252091 A1 | 9/2014 | Morse et al. |
| 2014/0304126 A1 | 10/2014 | Kim et al. |
| 2014/0313331 A1 | 10/2014 | Kim |
| 2014/0313693 A1 * | 10/2014 | Seo ....................... F25D 27/005 362/94 |
| 2014/0320647 A1 | 10/2014 | Seo et al. |
| 2014/0334691 A1 | 11/2014 | Cho et al. |
| 2014/0360213 A1 | 12/2014 | Son et al. |
| 2015/0002660 A1 | 1/2015 | Lee et al. |
| 2015/0013365 A1 | 1/2015 | Schessl et al. |
| 2015/0059374 A1 | 3/2015 | Hebel |
| 2015/0135737 A1 | 5/2015 | Cresswell et al. |
| 2015/0201157 A1 | 7/2015 | Chiang |
| 2015/0211783 A1 | 7/2015 | Marutani et al. |
| 2015/0244600 A1 | 7/2015 | Fay et al. |
| 2015/0241106 A1 | 8/2015 | Chase et al. |
| 2015/0260449 A1 | 9/2015 | Furuta et al. |
| 2015/0260450 A1 | 9/2015 | Marutani et al. |
| 2015/0267960 A1 | 9/2015 | Cheon et al. |
| 2016/0088262 A1 * | 3/2016 | Lee ........................ F25D 29/00 704/275 |

\* cited by examiner

REFRIGERATORS HAVING INTERNAL CONTENT CAMERAS, AND METHODS OF OPERATING THE SAME

RELATED APPLICATIONS

This application is a continuation of U.S. patent application Ser. No. 14/934,316, filed Nov. 6, 2015, now U.S. Pat. No. 10,027,866, and entitled "Refrigerators Having Internal Content Cameras, and Methods of Operating the Same," which claims the priority benefit of U.S. Provisional Patent Application No. 62/201,328, filed Aug. 5, 2015, and entitled "Object Recognition System For An Appliance And Method For Managing Household Inventory Of Consumables," the entirety of both is hereby incorporated by reference.

FIELD OF THE DISCLOSURE

This disclosure relates generally to refrigerators and, more particularly, to refrigerators having internal content cameras, and methods of operating the same.

BACKGROUND

Refrigerators have a cabinet, and one or more internal compartments in the cabinet. Doors are provided to allow a person to selectively open and close the compartment(s). In some examples, when a door is closed, the door prevents a person from seeing at least a portion of the interior of a compartment.

SUMMARY

A disclosed example refrigerator includes a cabinet, an internal compartment disposed within the cabinet, a closing member operatively coupled to the cabinet providing selective access to the internal compartment, two cameras disposed in the compartment and positioned to capture respective images of different portions of the compartment, two light sources disposed in the compartment, and a controller communicatively coupled with the cameras and light sources and configured to control the light sources to provide two different illuminations for respective ones of the two cameras.

A method of operating a refrigerator having two or more cameras, and illumination sources disposed within a compartment of the refrigerator includes controlling the illumination sources to provide a first illumination while one of the cameras captures a first image of the compartment, and controlling the illumination sources to provide a second illumination different than the first illumination while another of the cameras captures a second image of the compartment, wherein the first and second images are of different portions of the compartment.

DETAILED DESCRIPTION

In most instances, a person cannot view objects in their refrigerator while the door(s) of refrigerator are closed. This often causes the person to open their refrigerator simply to view the contents of their refrigerator, leading to increased energy consumption. Moreover, a person may not know, but may wish to know, what is in their refrigerator while they are shopping. This can result in running out of staples (e.g., milk, juice, eggs, etc.), or being unable to plan a meal around remaining food items, leading to potential food waste. Current solutions allow a person to view only a portion of their refrigerator; works only when the door is open, and/or requires complex camera movements in order to image larger portions of the refrigerator. In such solutions, crispers, door storage bins, and pantry pans may not be imaged. Content cameras for refrigerators, and methods of operating the same are disclosed herein that overcome at least these problems.

For ease of discussion, the examples disclosed herein are described in the context of a refrigerator. It should be understood that the examples disclosed herein are also applicable to other appliances including, but not limited to, an icemaker, a wine cooler, a freezer, a washing machine, a dryer, a clothes refresher, a stove, a microwave, an oven, and a dishwasher, including configurational variants thereof.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further still, connecting lines, or connectors shown in the various figures presented are intended to represent example functional relationships and/or physical or logical couplings between various elements. It should be noted that many alternative and/or additional functional relationships and/or physical or logical couplings may be present in practice. Moreover, no element or coupling is essential to the practice of the examples disclosed herein unless the element or coupling is specifically described as "essential" or "critical".

As used herein, the terms "remote," "remotely," or equivalents or permutations thereof mean that first and second remote functions are implemented by, at, or in separate or different devices, servers, appliances, etc. separated by any distance. Remote does not require a particular minimum separation distance. For examples, functions may be implement by different devices at the same geographic location (e.g., within a residence or a place of business).

Figure 1:
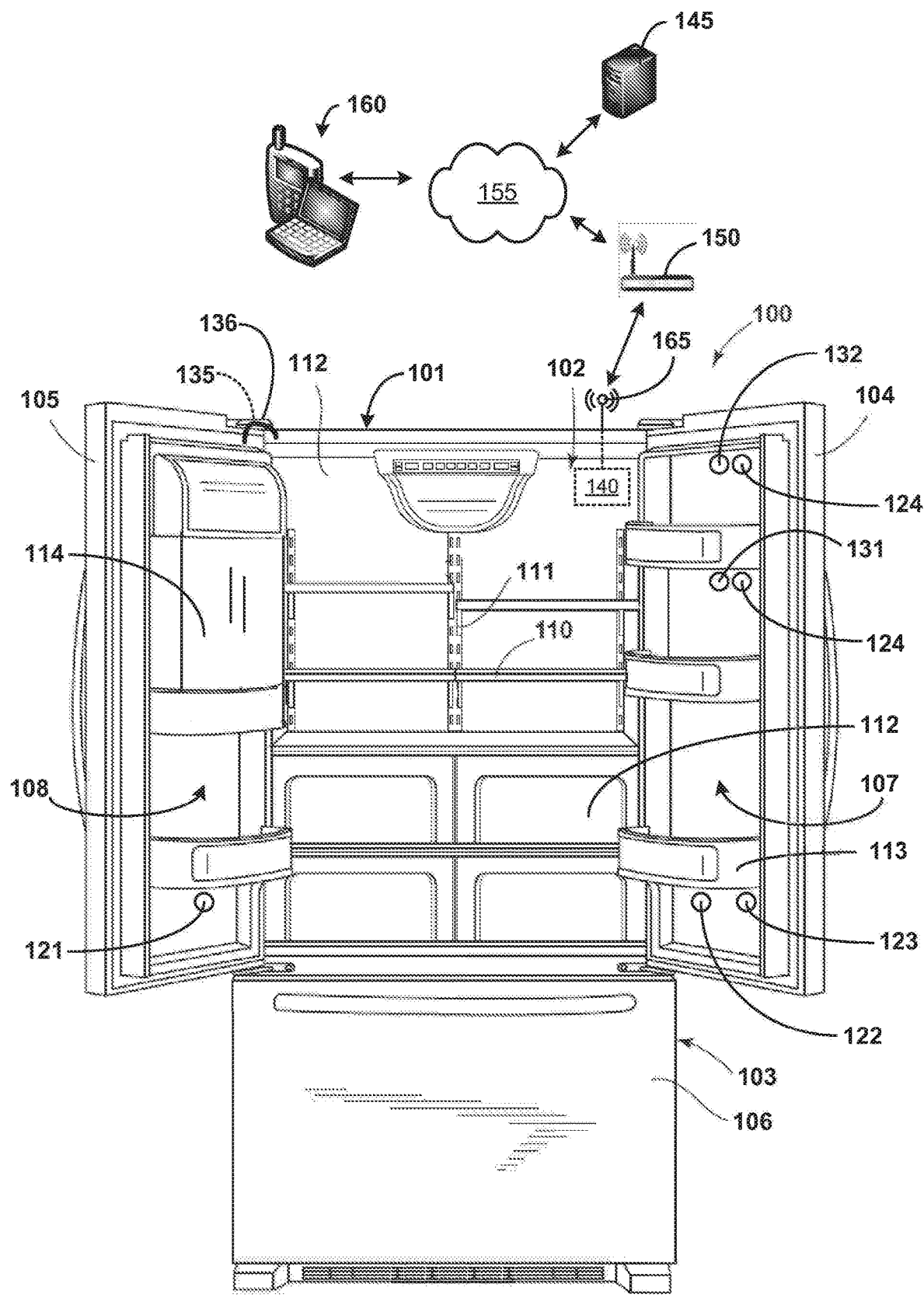
FIG. 1 is an illustration of an example refrigerator having content cameras implemented in accordance with the teachings of this disclosure.

FIG. 1 illustrates an example refrigerator 100 having a cabinet 101, and a refrigerated compartment 102 and a freezer compartment 103 within the cabinet 101. The refrigerated compartment 102 and the freezer compartment 103 each have an open face to provide access to the compartments 102 and 103. The refrigerator 100 includes one or more closing members in the form of doors 104 and 105, and a drawer 106 moveably mounted to the refrigerator 100 for movement between opened and closed positions to selectively open and close the open faces of the compartments 102 and 103. The doors 104, 105 may be formed or made of any combination(s) of glass, metal or any other material(s) that block, partially permit or wholly permit viewing of the compartment 102 while the doors 104, 105 are closed. The doors 104, 105 need not be formed of the same material(s).

To allow items to be stored in the refrigerator 100, the example refrigerator 100 of FIG. 1 includes one or more shelves (one of which is designated at reference numeral 110). In the example of FIG. 1, the shelves 110 are supported by brackets (one of which is designated at reference numeral 111) on a back wall 112 of the compartment 102. However, other means may be used to support the shelves 110. The example refrigerator 100 includes any number and/or type(s) of drawers (one of which is designated at reference numeral 112), and door storage bins (one of which is designated at reference numeral 113) on the doors 104, 105 to store items. In the example of FIG. 1, the refrigerator 100 includes an icemaker and/or ice storage 114 on the door 105.

While an example refrigerator configuration is shown in FIG. 1, it should be understood that the content cameras and methods of operating the same disclosed herein may be used with other refrigerator configurations including, but not limited to, a side-by-side configuration, a top-freezer configuration, a 4-door configuration, etc. Moreover, the dimensions and locations of elements shown in FIG. 1 are illustrative, and should not be used to ascertain the actual size and location of those elements in an actual refrigerator. Moreover, the depicted dimensions and locations are not to be used to read dimensions and/or locations, absolute or relative, into the appended claims.

To capture images of the interior of the compartment 102, the example refrigerator 100 includes five content cameras 121, 122, 123, 124, 125. While the example cameras 121-125 are disposed on the doors 104, 105, they may additionally and/or alternatively be disposed on the drawer front 106, or elsewhere within the compartment 102, and/or within the freezer compartment 103. Fewer or additional cameras may be implemented. The cameras 121-125 may be disposed at, in, as part of, integral with, etc. liners 107, 108 of the doors 104, 105, as shown in FIG. 1. When installed, normally during manufacture, the cameras 121-125 become electrically and/or communicatively coupled to other components of the refrigerator 100 using any wired or wireless protocol, signal, component, switch, hub, router, etc. such as, but not limited to, those associated with universal serial bus (USB), wireless fidelity (Wi-Fi®), Bluetooth, RS485, etc., or any combination(s) thereof. Propriety protocol, signal, component, switch, hub, router, etc. may, additionally and/or alternatively, be used.

To illuminate the compartment 102, the example refrigerator 100 of FIG. 1 includes one or more light sources, two of which are designated at reference numerals 131 and 132. In some examples, a light source 131, 132 is implemented together with each of the cameras 121-125. Any number of the same or different type(s) of light sources may be implemented. In some examples, the light sources are implemented using light-emitting diodes (LEDs). Additionally and/or alternatively, fluorescent, incandescent, halogen, or any combination(s) of light sources may be used. In some examples, one or more of the light sources are individually, separately and/or differently pulse-width modulated to allow the amount or intensity of light and/or color of light emitted by a light source to be varied and, in some examples, different from another light source. For example, a light source illuminating a larger area may be controlled to emit more light than another light source associated with a smaller area. In some instances, two light sources may be used to illuminate an area, while only one of them is used to illuminate another area. Further, a light source illuminating the interior of a drawer formed of a color material may be controlled to emit a colored light that at least partially compensates for the color material. Further still, different combinations of light sources 131, 132 may be used to, for example, reduce shadows. For example, for a shelf 110 where it is typical for a person to place tall items in front of shorter items, light sources 131, 132 may be positioned and used to light the shelf 110 from different angles with possibly different intensities. Some light sources 131, 132 may be angled, while others are straight.

During the capture of pictures or images, different colors of light and/or different types of light can be used to create various illuminations. Changes in the color of light such as between blue, green, red and other colors can reveal different characteristics concerning items in the refrigerator 100. Additionally, different types of light (i.e., fluorescent, incandescent, LED, halogen, combinations thereof, etc.) can have an effect on how an item is imaged. For example, certain types of artificial light may travel through various containers in a more efficient and/or effective manner than other types of artificial lighting. The use of alternate lighting colors and/or lighting types can be helpful to distinguish between items that may have a similar shape. The use of types of colors of light can also assist in determining the state, such as in terms of spoilage, remaining contents, and other information of items.

Figure 2:
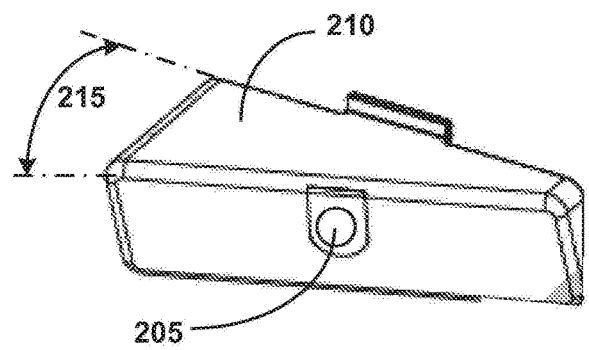
FIGS. 2-5 illustrate example manners of disposing a content camera in the example refrigerator of FIG. 1.
Figure 3:
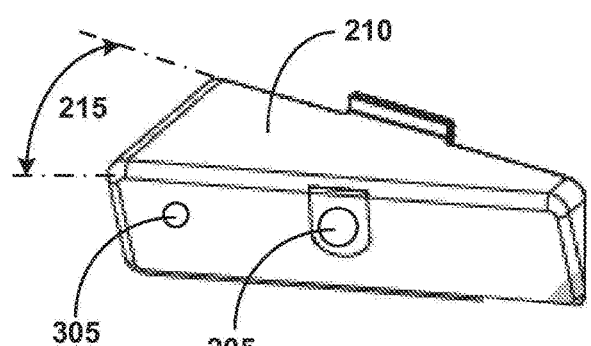

Additionally and/or alternatively, as shown in FIGS. 2 and 3, a camera 205 may be mounted in, on, within, etc. a housing 210 that affixes to, mounts to, snaps onto, etc. the liners 107, 108 of the doors 104, 105. A housing 210 may, additionally or alternatively, be disposed on the drawer front 106, or elsewhere within the compartment 102, and/or within the freezer compartment 103. As shown in FIGS. 2 and 3, the housing 210 may be constructed to position the camera 205 at an angle 215 relative to the liners 107, 108 of the doors 104, 105; and be mounted to the liners 107, 108 via, for example, a snap feature 220, a screw feature, etc. As shown in FIG. 3, a light source 305 may additionally be implemented together with the camera 205 and the housing 210. When the housing 210 is installed within the refrigerator 100, the camera 205 becomes electrically and/or communicatively coupled to other components of a refrigerator. In some examples, the camera 205 is manually coupled via a connector, is electromagnetically coupled when proximate to a conductor, connector, pad, antenna, wire, etc. within a door, is wirelessly coupled via Wi-Fi or Bluetooth, etc. In some examples, only some of the cameras 121-125 are angled.

Figure 4:
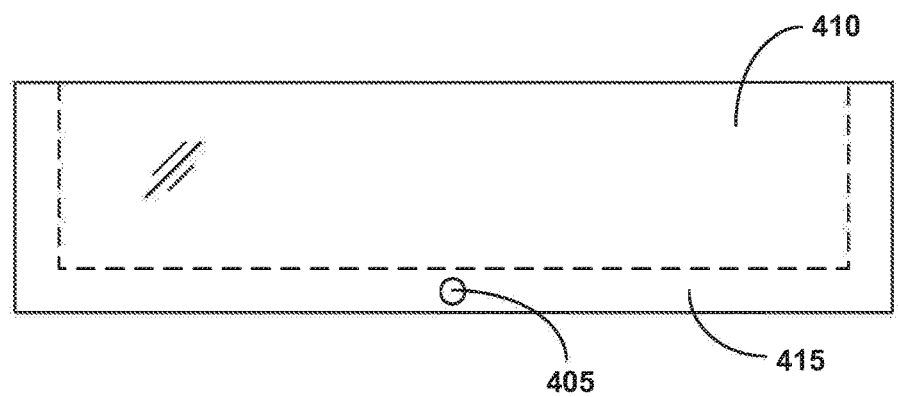
Figure 5:
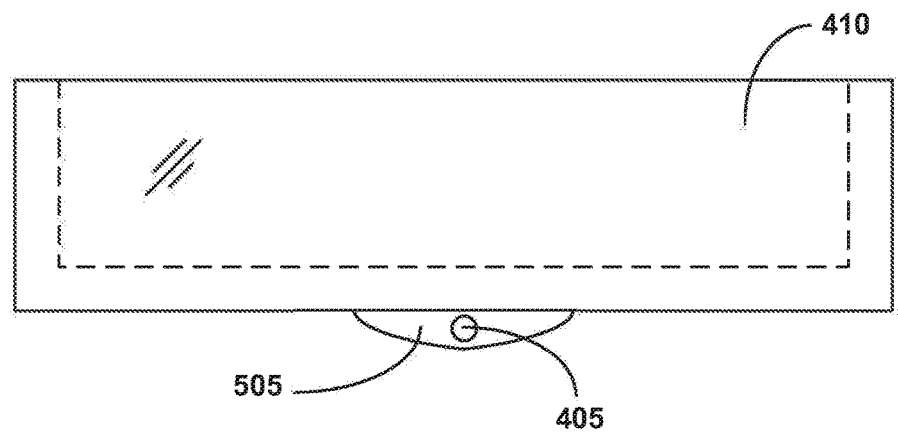

Additionally and/or alternatively, as shown in FIGS. 4 and 5, a camera 405 may be implemented together with a storage bin 410 that is fixed in place or is selectively positionable. The example storage bin 410 may be used to implement any of the example bins 113 of FIG. 1. In the example of FIG. 4, the camera 405 is disposed within a bottom 415 of the bin 410. In the example of FIG. 5, the camera 405 is disposed in a feature 505 that extends below the bin 410. Similar to FIG. 3, the storage bins 410 may additionally and/or alternatively implement a light source 505. In some examples, the camera 405 is manually coupled via a connector, is electromagnetically coupled when is proximate to a connector, wire, cable, pad, emitter, antenna and/or conductor within a door, is wirelessly coupled via Wi-Fi or Bluetooth, etc.

While content cameras implemented on a liner will typically be installed during manufacture of a refrigerator, use of the housings 210 and/or the bins 410 permit content cameras and/or light sources to be installed during delivery or installation, and/or thereafter.

Although cameras and light sources may be co-located, the light sources need not be co-located with cameras. Moreover, there need not be the same number of light sources as cameras. Further, even if cameras are disposed on the doors, one or more of the light sources need not be disposed on a door.

Typically, the content cameras and light sources disclosed herein will be at least partially sealed and/or enclosed to prevent damage due to exposure to, for example, anticipated liquid and/or to facilitate cleaning of the refrigerator. However, content cameras and light sources need not be sealed.

In some examples, a camera and/or a light source disposed on a door is coupled to other components of a refrigerator via one or more wires, cables, conductors, etc. 135 passing through a door hinge 136. Note, the conductor 135 is purposefully exaggerated in FIG. 1 to assist the viewer. In some examples, multiple cameras and/or light sources are disposed on a door, and are coupled through a top door hinge to, for example, a hub, multiplexer, switch, etc. such as, but not limited to, a USB hub or switch, located at the top of a refrigerator 100 near the top door hinge. The communication hub, multiplexer, switch, etc. may be disposed at other locations such as, but not limited to, together with a controller in the form of, for example, an appliance control unit (ACU) 140 discussed below in connection with FIG. 6, at a human-interface (HMI) located on a front of door. An HMI allows a user to control and/or monitor an appliance, such as the refrigerator 100. Of course other locations may be used.

As shown in FIGS. 1, 4 and 5, placement of cameras and/or light sources at or beneath a structure, such as a bin or shelf, provides some protection against mechanical damage and/or inadvertent exposure to, for example, liquid. However, cameras and/or light sources may be placed at any suitable or selected location in a refrigerator.

Returning to FIG. 1, by positioning the content cameras 121-125 on the doors 104, 105, images can be captured by the content cameras 121-125 that represent a larger extent of the compartment 102 than existing solutions because of the additional physical separation between the liners 107, 108 and the front edge of the shelves 110 and the front of the drawers 112. By being further away from contents of the refrigerator 100, the cameras 121-125 can capture images having wider fields of view. By purposefully distributing the cameras 121-125 between the doors 104, 105, as conceptually shown in FIG. 1, the cameras 121-125 can collectively image substantially the entire compartment 102. Furthermore, the conventional structure(s) and/or placement of, for example, storage bins, etc. on the doors 104, 105 present less impairments to the field-of-views of the cameras 121-125, as compared to other placements elsewhere within the compartment 102. In those other placements, shelves, drawers, etc. present greater impairments to camera field-of-view. In some examples, the positions and/or angles of the cameras 121-125 can be determined using, for example, simulation, computer added design (CAD), empirical analysis, etc. In a specific example, one camera is disposed on the door 105 and four cameras are disposed on the door 104 and image a top shelf, a middle shelf, a left crisper drawer, and a right crisper drawer. Servos, motors, steppers, actuators, linear actuators, etc. may be used to move the cameras 121-125 in one or more directions during use. Use of camera movement may allow the implementation of fewer cameras 121-125. For example, the ACU 140 can move a camera 121-125 to a first position, capture an image, move the camera to a second position, and capture another image. In this way, the ACU 140 can capture images within the compartment 102 using fewer cameras. Additionally and/or alternatively, a user of the user device 160 can remotely move a camera 121-125 to allow an image to be captured of a particular portion of the compartment 102.

To control, among other things, the cameras 121-125 and the light sources 131, 132, the example refrigerator 100 of FIG. 1 includes the ACU 140. The example ACU 140 of FIG. 1 controls the cameras 121-125 to sequentially take or capture images or pictures of respective different portions of the compartment 102. In some examples, at least some of the cameras 121-125 capture images or pictures at substantially the same time. In some examples, the ACU 140 controls the cameras 121-125 to capture the images after the ACU 140 determines that the doors 104, 105 closed. The example ACU 140 sends the images to a remote server 145 via, for example, a home router 150, and one or more private and/or public networks 155, such as the Internet, a cellular network and/or a Wi-Fi network. The images captured by the content cameras 121-125 are provided to or made available to a user device 160, such as a smartphone or laptop, by the example server 145. Other example consumer user devices 160 include, but are not limited to, a personal computer (PC), a workstation, a residential gateway, a set-top box, a netbook, a tablet PC, a smart watch, a tablet, a media player, a game console, a Chromebook, and/or any other type of computing device containing a processor. In some examples, a user interface on a front of the refrigerator 100 may implement the user device 160. In some examples, more than one controller is provided. For example, the controller 140 may detect the closing of the door(s) 104 and/or 105, while another controller controls a sequence of illumination, and picture or image capture. The other controller may be, for example, the communication hub, multiplexer, switch, etc. discussed above. Other combination(s) of other controllers may be used.

It is contemplated that any number and/or type(s) of wired and/or wireless communication device(s), network(s), technology(-ies), method(s), etc. may be used to communicatively couple the refrigerator 100, the server 145, the network 155, and the consumer user device 160. Thus, the example shown in FIG. 1 is intended to merely represent example logical couplings between the various elements. Moreover, it should be understood that the example content cameras and methods of operating the same may be implemented using any of these various implementations. Further, while an antenna 165 of the refrigerator 100 is shown as external, it may be partially or fully internal depending on implementation.

Figure 6:
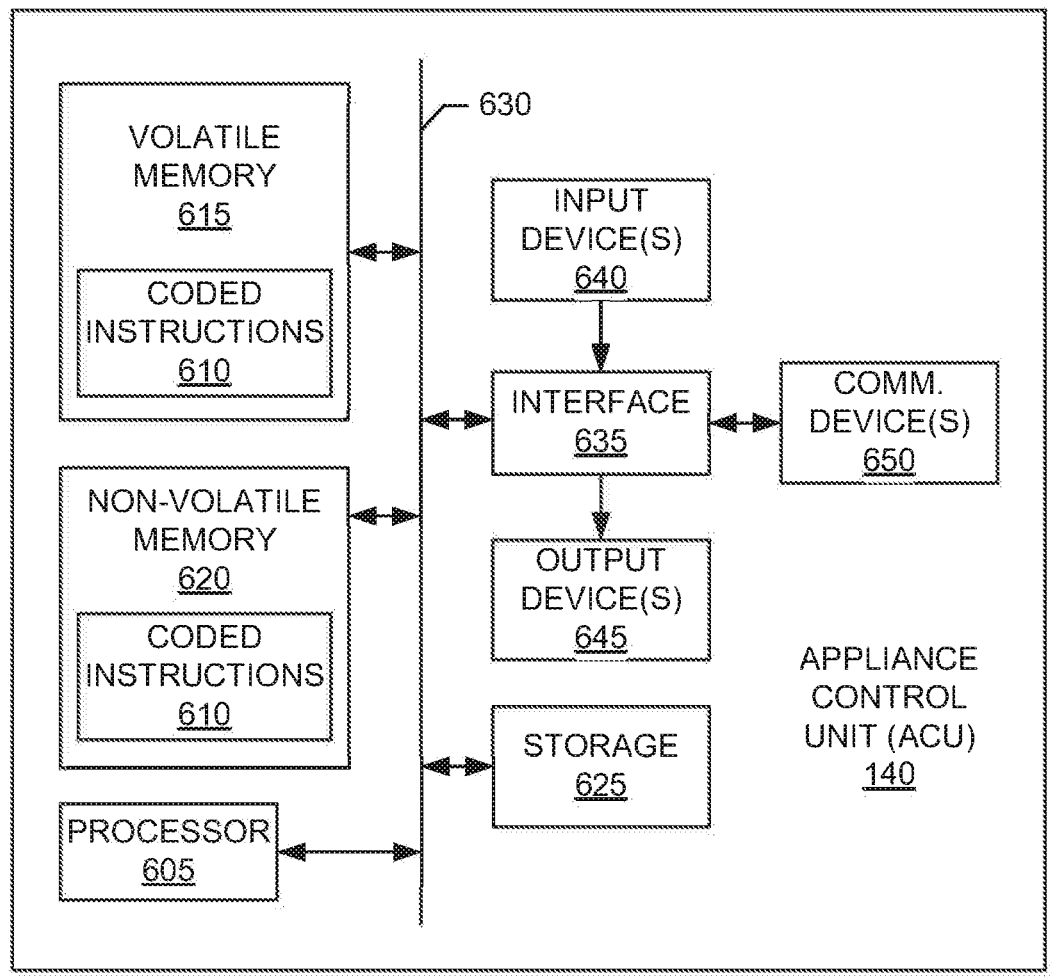
FIG. 6 illustrates an example control platform for the example refrigerator of FIG. 1.
Figure 6:
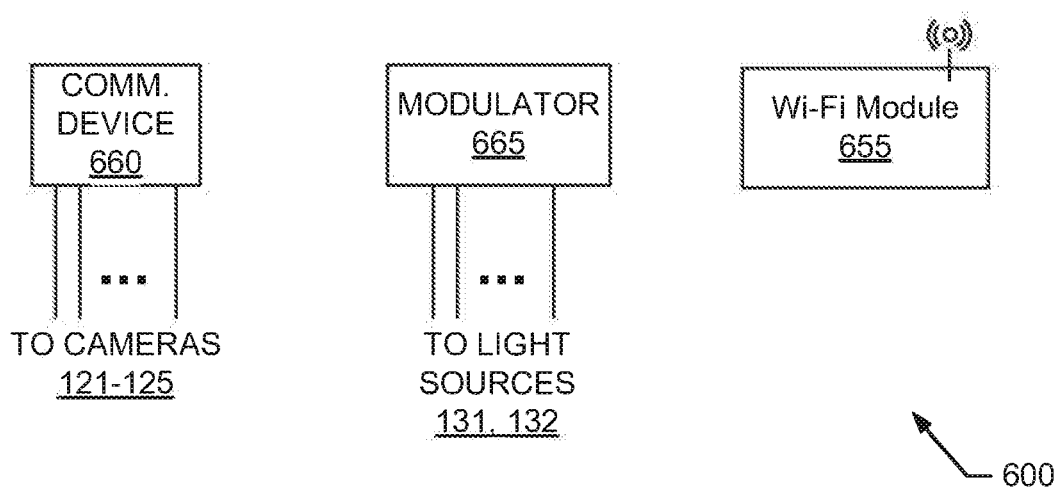

In the example of FIG. 1, the ACU 140 sends images to the server 145 as each image is captured. That is, the ACU 140 waits to capture an image until transmission of a previous image has been initiated or completed. The ACU 140 notifies the server 145 of a first in a sequence of images, and then notifies the server 145 when all the images in a group have been sent. The group reflecting, in aggregate or collectively, a representation of substantially all of the compartment 102. Other methods of transmitting images may be used. For example, a group of images or pictures can be captured and stored in the refrigerator 10 (e.g., in the ACU 140), and then subsequently or later transmitted to the server 145 sequentially or in bulk. FIG. 6 discussed below depict example manners of implementing the example ACU 140 of FIG. 1.

When a new group of pictures has been received at the server 145, the example server 145 of FIG. 1 sends a notification to the user device 160 that a new group of pictures is available. Depending on the user device 160, a user of the user device 160 may be notified of the new group of pictures. Alternatively, the user interacts with the user device 160 to determine if/when a new group of pictures is available. Further still, the user may operate a program executing on the user device 160 to check for the group of pictures. In some examples, such a program is a web browser, or a custom-built program provided by the manufacture of the refrigerator 100, or a designee thereof. The custom-built program may additionally allow the user to monitor and/or control other aspects of the refrigerator 100 and/or other appliances associated with that user. In some alternatives, the user device 160 can directly interact with the ACU 140 locally and/or remotely to directly obtain the group of pictures.

Turning to FIG. 6, an example control platform 600 for the example refrigerator 100 of FIG. 1 is shown. The example control platform 600 of the instant example includes the ACU 140 having at least one programmable processor 605. For example, the processor 605 can be implemented by one or more Atmel®, Intel®, AMD®, and/or ARM® microprocessors. Of course, other processors from other processor families and/or manufacturers are also appropriate. The processor 605 executes coded instructions 610 present in main memory of the processor 605 (e.g., within a volatile memory 615 and/or a non-volatile memory 620), or stored on a storage device 625, a removable computer-readable storage medium such as a compact disc (CD), a digital versatile disk (DVD), a FLASH drive, etc.

The processor 605 is in communication with the main memory including the non-volatile memory 620 and the volatile memory 615, and other storage devices via a bus 630. The volatile memory 615 may be implemented by, for example, synchronous dynamic random access memory (SDRAM), dynamic random access memory (DRAM), RAMBUS® dynamic random access memory (RDRAM) and/or any other type of RAM device(s). The non-volatile memory 620 may be implemented by, for example, flash memory(-ies), flash memory device(s) and/or any other desired type of memory device(s). Access to the memory 615 and 620 may be controlled by a memory controller, not shown.

The control platform 600 also includes an interface circuit 635. Any type of interface standard, such as an external memory interface, serial port, general-purpose input/output, as an Ethernet interface, a USB interface, and/or a peripheral component interface (PCI) express interface, etc., may implement the interface circuit 635.

One or more input devices 640 are connected to the interface circuit 635. The input device(s) 640 permit a user to enter data and commands into the processor 605. The input device(s) 640 can be implemented by, for example, a door closure sensor, a keyboard, a mouse, a touch screen, a track-pad, a trackball, a proximity sensor, and/or a voice recognition system.

One or more output devices 645 are also connected to the interface circuit 635. The output devices 645 can be implemented, for example, by display devices (e.g., a display, indicators, light emitting diodes, and/or speakers. The example lighting sources 131, 132 of FIG. 1 may be implemented by the output devices 645. The example cameras 121, 122 of FIG. 1 may be implemented as input devices 640 and output devices 645.

The interface circuit 635 may also include one or more communication device(s) 650 and/or antennae such as a network interface card or module to facilitate exchange of data with other appliances, devices, computers, nodes and/or routers of a network. For example, the interface circuit 635 may implement a Wi-Fi module 655 and/or the example antenna 165 of FIG. 1.

The example control platform 600 includes a communication device 660 implementing any wired and/or wireless protocol, signal, component, switch, hub, router, etc. In some non-limiting examples, the communication device 660 implements a USB hub or switch, as shown in FIG. 6.

To control the illumination generated by the lighting sources 131, 132, the example control platform 600 includes a modulator, such as a pulse-width modulator 665.

The Wi-Fi module 655, the communication device 660, and/or the modulator 665 may be co-located with the ACU 140, or implemented elsewhere in the refrigerator 100. That is, they may be disposed on any number of printed circuit board(s) located at any number of location(s). For example, the modulator 665 may be implemented on the same PCB as the ACU 140, with the communication device 660 and the Wi-Fi module 655 each located on their own PCBs. The ACU 140 communicates with and receives images from the cameras 121-125 via the communication device 660, including in some examples controlling the position(s) of the cameras 121-125. The ACU 140 controls the intensity and/or color of light emitted by the light sources 131, 132 by, for example, controlling PWM signals generated and sent by the modulator 665 to the light sources 131, 132. The Wi-Fi module 655 implements any number and/or type(s) of wireless communication signals including variants of IEEE 802.11, Bluetooth, etc.

While an example implementation of the ACU 140 of FIG. 1 are shown in FIG. 6, one or more of the interfaces, elements and/or devices illustrated in FIG. 6 may be combined, divided, re-arranged, omitted, eliminated and/or implemented in any other way. Further, any of the interfaces, elements and/or devices of FIG. 6 may be implemented by one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Further still, the example ACU 140 may include interfaces, elements and/or devices instead of, or in addition to, those illustrated in FIG. 6, and/or may include more than one of any or all of the illustrated interfaces, elements and/or devices.

Figure 7:
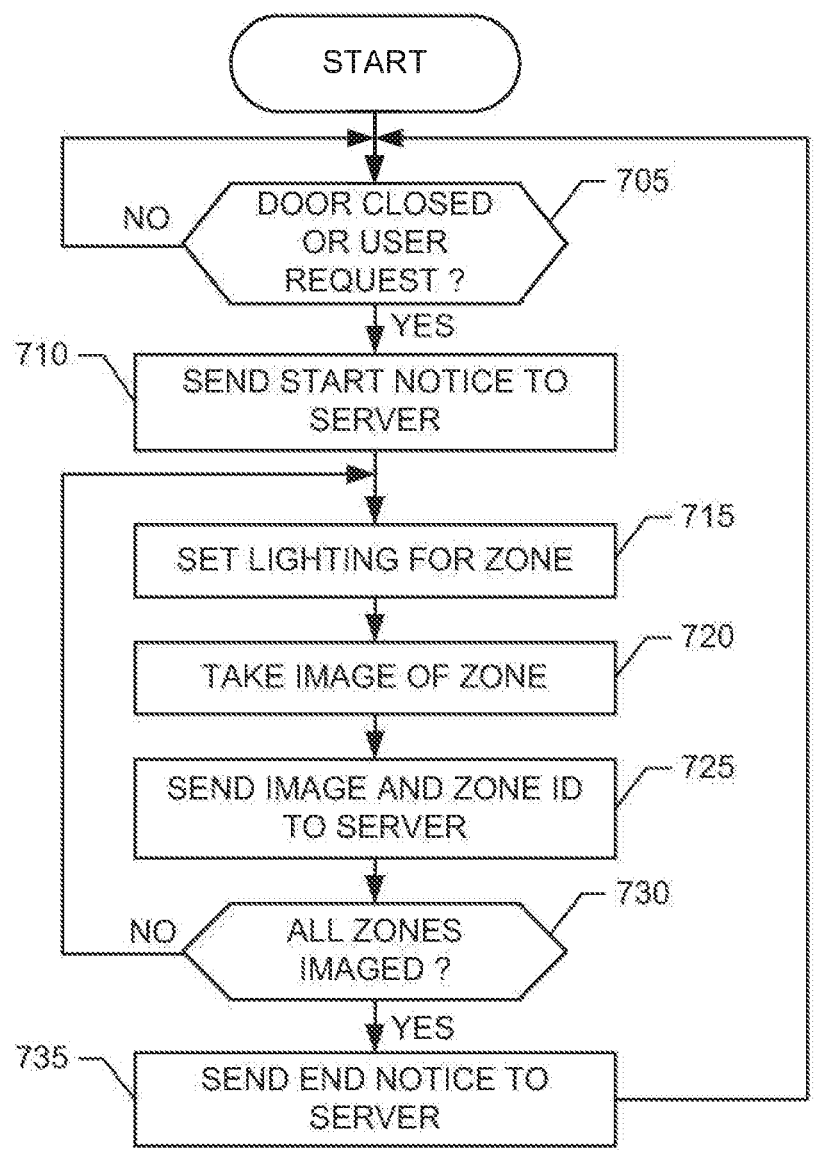
FIG. 7 is a flowchart illustrating an example process that may, for example, be implemented using machine-readable instructions executed by one or more processors to implement the example refrigerator of FIG. 1.

FIG. 7 is a flowchart of an example process that may, for example, be implemented as machine-readable instructions carried out by one or more processors, such as the example control platform 600 of FIG. 6. The example machine-readable instructions of FIG. 7 begin with the example control platform 600 waiting until the door(s) 104, 105 of the refrigerator 100 are closed (block 705). When the door(s) are closed (block 705), the control platform 600 sends a start notice to the server 145 that a new group of images of the refrigerator 100 are going to be sent (block 710). The control platform 600 sets and/or controls the light source(s) 131, 132 to form a first intensity and/or color of illumination (block 715), and controls one of the cameras 121-125 to capture an image of a first portion or zone of the compartment 102 (block 720). The control platform 600 initiates sending of the image to the server 145 (block 725). If not all images have been captured (block 730), control returns to block 715 to capture the next image. When all images have been captured (block 730), the control platform 600 sends an end notice to the server 145 to inform the server 145 that all images have been captured and sent (block 735). Control returns to block 705 to wait for another door closure to be detected. The zones may be imaged in any order such as clockwise or row-by-row.

At block 715, the control platform 600 controls the light sources 131, 135 to collectively emit light of different color, different intensity and/or different angle between at least two of the images. The light may be varied by, for example, changing the number of active light sources, which light sources are active, the angle(s) of active light sources, the color(s) of light emitted by the light sources, the intensity(-ies) of light emitted by the light sources, etc.

In the example of FIG. 7, a door closure event triggers the control platform 600 to capture and send a group of images to the server 145. Other triggers may, additionally and/or alternatively, be used. For example, a person may operate a control panel of the refrigerator 100, a person of the user device 160 may operate the user device 160 to request a new group of images. For example, a person who is shopping may want to capture a new group of images, etc.

Other methods of transmitting images may be used. For example, a group of images or pictures can be captured and stored in the refrigerator 10 (e.g., in the ACU 140), and then subsequently or later transmitted to the server 145 sequentially or in bulk.

Figure 8:
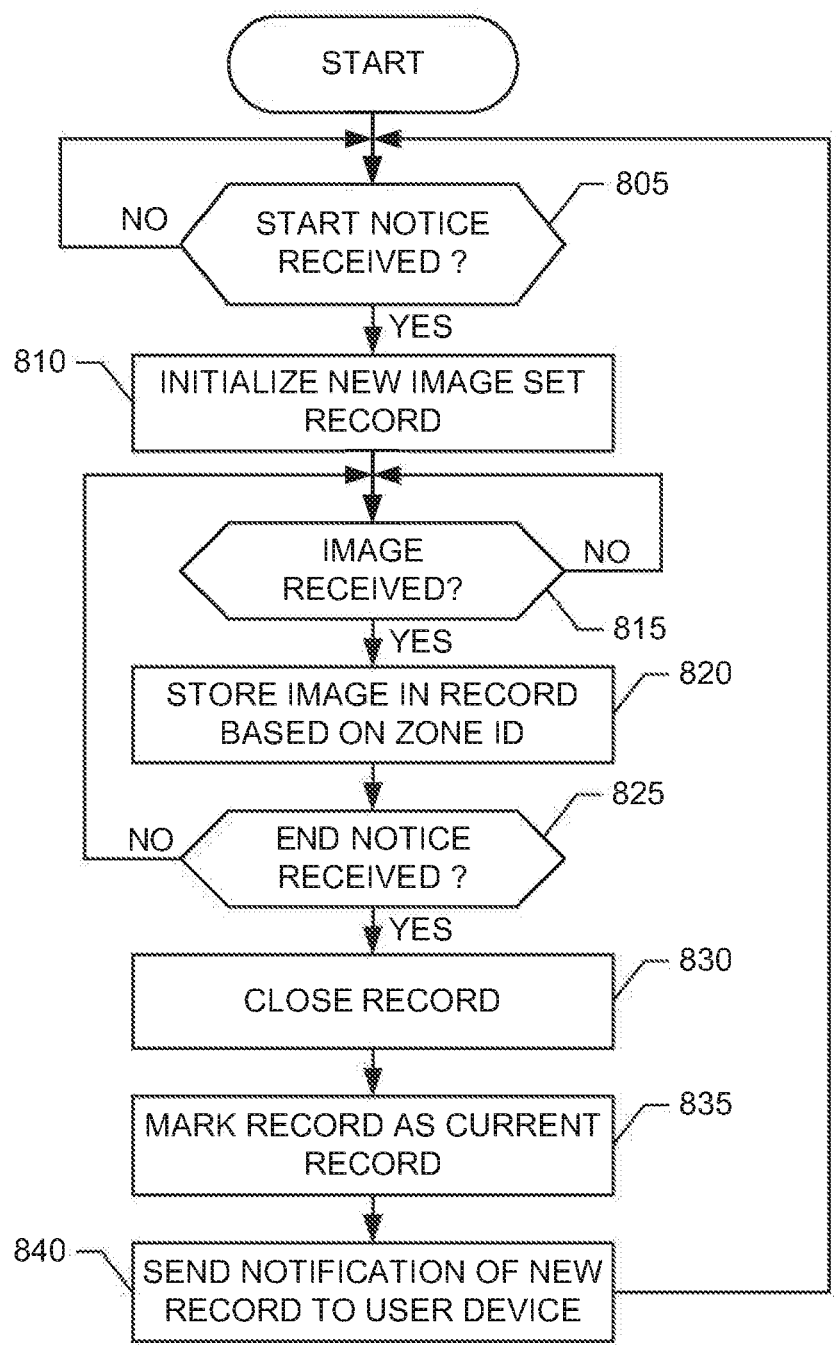
FIG. 8 is a flowchart illustrating an example process that may, for example, be implemented using machine-readable instructions executed by one or more processors to implement the example server of FIG. 1.

FIG. 8 is a flowchart of another example process that may, for example, be implemented as machine-readable instructions carried out by one or more processors to implement the example server 145 of FIG. 1. The example machine-readable instructions of FIG. 8 begin with the example server 145 waiting to receive a start notice from the refrigerator 100 (block 805). When a start notice is received (block 805), the server 145 initializes a record or data set for a new group of images (block 810). When an image is received from the refrigerator 100 (block 815), the server 145 stores the received image in the record or data set (block 820). If an end of notice is not received (block 825), control returns to block 815 to wait for another image. If an end of notice is received (block 825), the server 145 closes the record or data set (block 830), and marks the record or data set as the most recent (block 835). The server 145 sends a notice of the new record or data set to the user device 160 (block 840), and control returns to block 805 to wait for another start notice.

Figure 9:
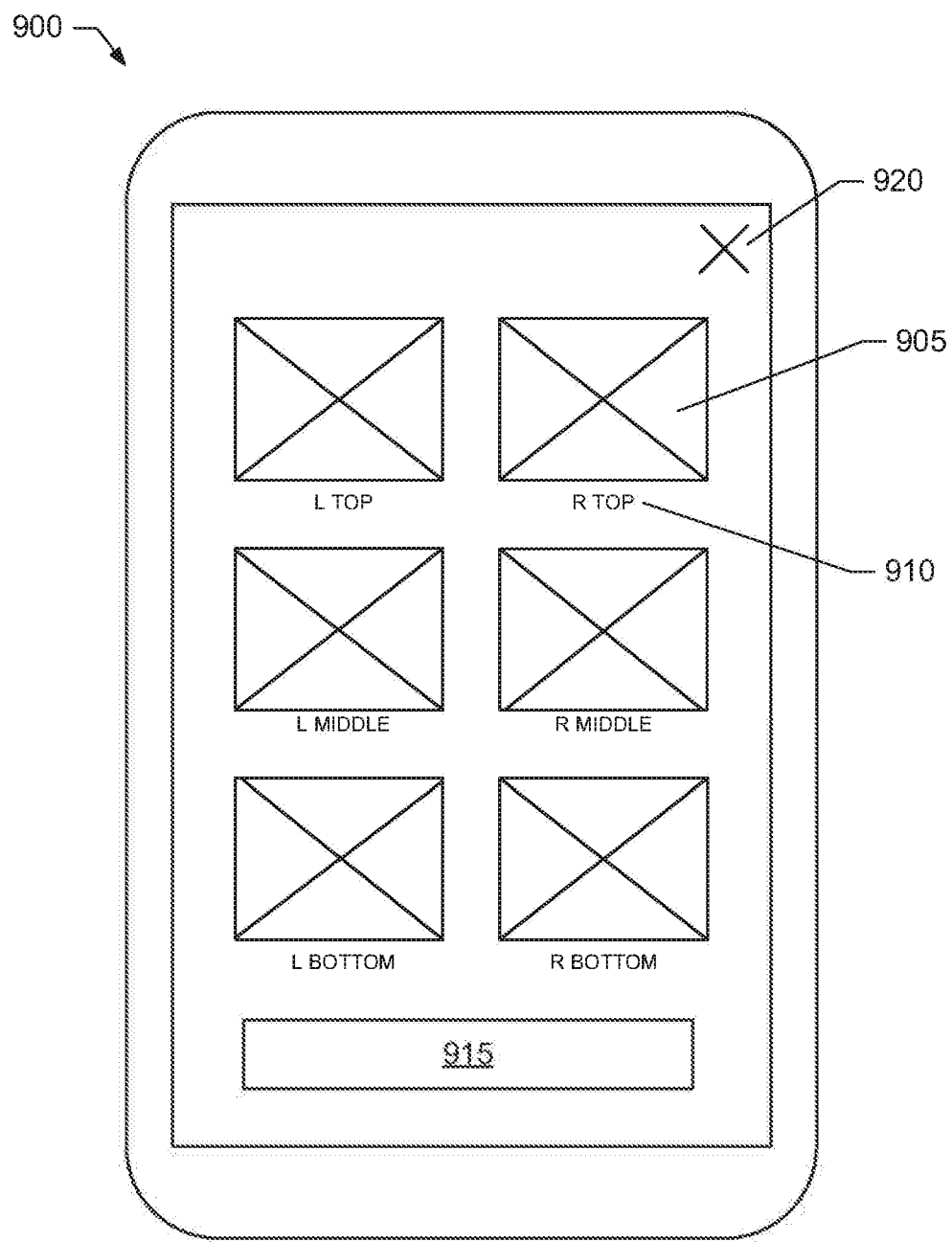
FIGS. 9 and 10 illustrate example user interfaces that may be implemented by the example user device of FIG. 1 to present images captured of the compartment of the example refrigerator of FIG. 1.
Figure 10:
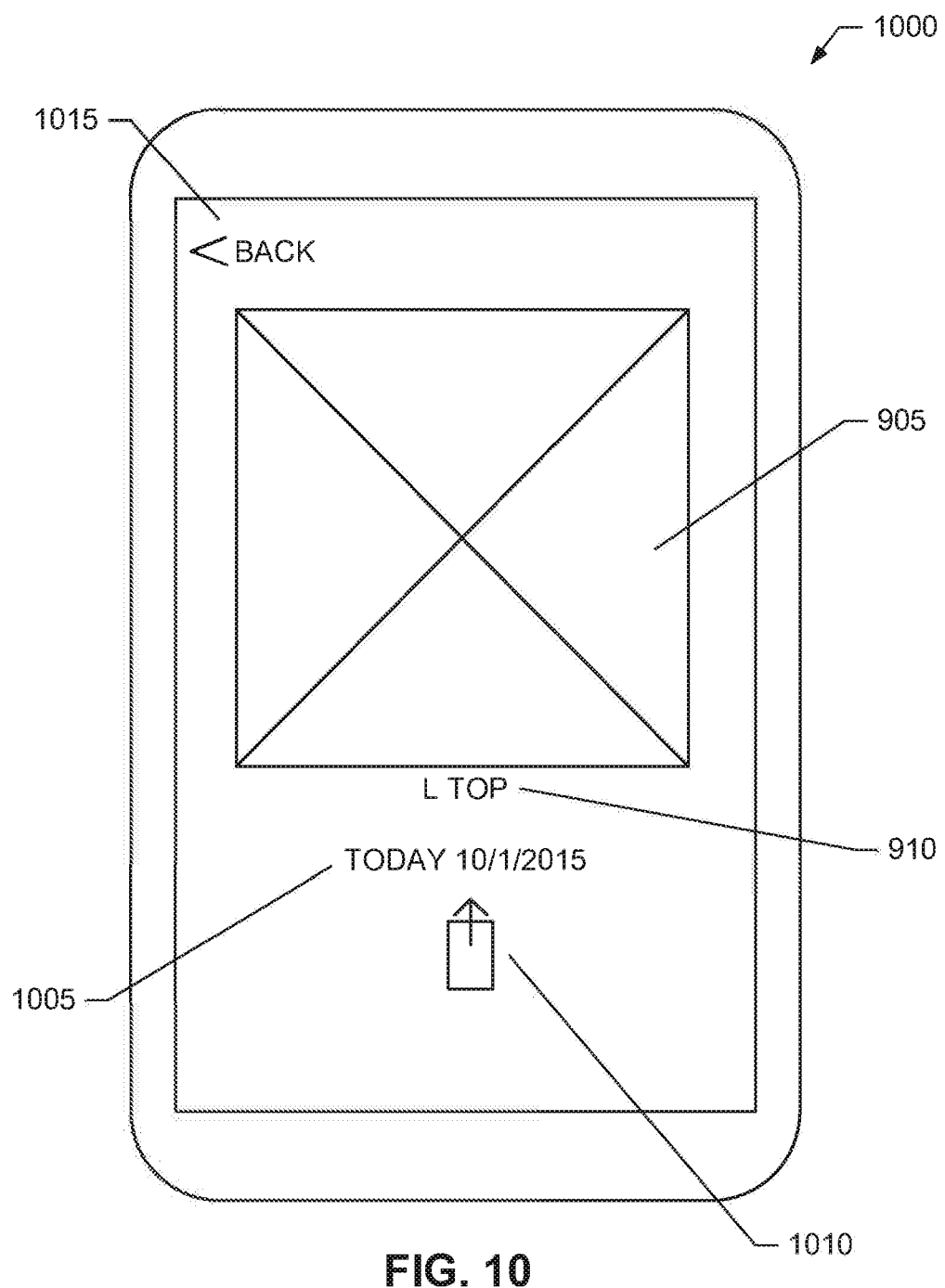

FIGS. 9 and 10 illustrate example graphical user interfaces (GUIs) 900 and 1000 that may be implemented or displayed on a user device 160 to enable a user to display or view images captured in the example refrigerator 100 of FIG. 1. The example GUI 900 of FIG. 9 is activated when, for example, a user selects an "interior view" GUI element of another GUI. The example GUI 900 displays an aggregate or composite of a group or set of images, one of which is designated at reference numeral 905. In some examples, when the GUI 900 is activated, the most recent group of images is displayed.

Each of the images 905 corresponds to a different portion of a compartment of the refrigerator 100. Each of the images 905 has a corresponding label or description 910 that, for example, identifies or indicates the portion of the refrigerator 100 associated with the image 905. The images 905 may be arranged in any way, such as logically corresponding to the respective physical locations of the zones in the refrigerator 100. In some examples, a user can modify the arrangement of the images 905 by, for example, dragging the images 905 within the GUI 900.

One or more GUI elements 915 may be used to move between sets or groups of images taken at different times or on different days. In some examples, the elements 915 include a plurality of selectable GUI elements corresponding to different groups of images. In other examples, a user can move between groups of images using a swipe or scroll gesture. A user may close the GUI 900 by selecting a close GUI element 920.

The example GUI 1000 of FIG. 10 may be activated by, for example, pressing or selecting one of the images 905 in the GUI 900 of FIG. 9. The example GUI 1000 of FIG. 10 displays a larger version of the selected image 905 to permit more detailed viewing, and its associated label 910. The GUI 1000 displays day of week, date, time, etc. information 1005 representing when the displayed image 905 was taken.

In some examples, the GUI 1000 includes a GUI element 1010 that allows a user to, for example, save, send or share the displayed image 905. A close GUI element 1015 is provided to enable a user to return to the example GUI 900 of FIG. 9.

Instead of being embodied as machine-readable instructions carried out by one or more processors, some or all of the example methods of FIGS. 7 and 8 may be implemented using any combination(s) of fuses, application-specific integrated circuit(s) (ASIC(s)), programmable logic device(s) (PLD(s)), field-programmable logic device(s) (FPLD(s)), field programmable gate array(s) (FPGA(s)), discrete logic, hardware, firmware, etc. Further, many other methods of implementing the example methods of FIGS. 7 and 8 may be employed. For example, the order of execution may be changed, and/or one or more of the blocks and/or interactions described may be changed, eliminated, sub-divided, or combined. Additionally, any or the entire example methods of FIGS. 7 and 8 may be carried out sequentially and/or carried out in parallel by, for example, separate processing threads, processors, devices, discrete logic, circuits, etc.

As used herein, the term "computer-readable medium" or equivalents thereof is expressly defined to include any type of computer-readable medium, and to expressly exclude propagating signals. Example computer-readable medium include, but are not limited to, a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor, such as the example compute platform 600 of FIG. 6.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A refrigerator comprising:
   a cabinet;
   an internal compartment disposed within the cabinet;
   a door operatively coupled to the cabinet by a door hinge and providing selective access to the internal compartment;
   a camera operatively coupled with the door and adjustable to capture images of different portions of the internal compartment;
   light source disposed in the internal compartment and adjustable to different angles to provide different illuminations within the internal compartment; and
   a controller disposed in the cabinet and communicatively coupled with the camera and the light source through the door hinge.

2. The refrigerator of claim 1, wherein the controller is configured to:
   control the light source to provide a first illumination in the cabinet during capture of a first image; and
   control the light source to provide a second illumination different than the first illumination in the cabinet during capture of a second image.

3. The refrigerator of claim 2, wherein the first and second illuminations differ in color.

4. The refrigerator of claim 1, wherein the images are stored at a remote server for retrieval by a remote user device.

5. The refrigerator of claim 1, wherein the camera is disposed on one of a wall of the internal compartment, a shelf, and a storage bin.

6. The refrigerator of claim 1, further comprising:
   a pulse-width modulator, wherein the controller controls the pulse-width modulator to control illuminations made by the light source.

7. The refrigerator of claim 1, wherein the controller controls the camera to capture the images after a door closure event is detected.

8. A refrigerator comprising:
   a cabinet;
   an internal compartment disposed within the cabinet;
   a door operatively coupled to the cabinet by a door hinge and providing selective access to the internal compartment;
   a camera operatively coupled with the door and adjustable between different positions to capture images of different portions of the internal compartment;
   a plurality of light sources disposed in the internal compartment and adjustable to provide different illuminations within the internal compartment;
   a controller disposed in the cabinet and communicatively coupled with the camera and the light sources through the door hinge, the controller configured to capture the images after a door closure event is detected; and
   an appliance control unit disposed in said refrigerator and configured to store the captured images.

9. The refrigerator of claim 8, wherein the controller is configured to:
   control the plurality of light sources to provide a first illumination in the cabinet during capture of a first image; and
   control the plurality of light sources to provide a second illumination different than the first illumination in the cabinet during capture of a second image.

10. The refrigerator of claim 8, wherein the appliance control unit transmits the images to a remote server for retrieval by a remote user device.

11. The refrigerator of claim 8, wherein the camera is disposed on one of a wall of the internal compartment, a shelf, and a storage bin.

12. The refrigerator of claim 8, further comprising:
    a pulse-width modulator, wherein the controller controls the pulse-width modulator to control illuminations made by the light source.

* * * * *